Patented Apr. 22, 1924.

1,491,021

UNITED STATES PATENT OFFICE.

HAROLD S. ADAMS, OF NAUGATUCK, CONNECTICUT, ASSIGNOR TO THE NAUGATUCK CHEMICAL COMPANY, A CORPORATION OF CONNECTICUT.

PROCESS OF MAKING THIOCARBONIC-ACID DISULPHIDE.

No Drawing. Application filed November 10, 1922. Serial No. 599,960.

*To all whom it may concern:*

Be it known that I, HAROLD S. ADAMS, a citizen of the United States, residing at Naugatuck, county of New Haven, and State of Connecticut, have invented a certain new and useful Process of Making Thiocarbonic-Acid Disulphide, of which the following is a full, clear, and exact description.

This invention relates to processes for making organic disulphides particularly thiocarbonic acid disulphides. The invention includes chlorinating the addition product of carbon disulphide, a caustic alkali and a monohydric alcohol.

This application is a continuation in part of my application Serial No. 436,336, filed January 10, 1921.

In its preferred form the process is carried out as follows: 25 lbs. of normal butyl alcohol and 28 lbs. of $CS_2$ are mixed in a round bottomed iron kettle provided with a jacket for cooling purposes, and 12½ lbs. of powdered NaOH are gradually added with stirring and cooling. The soda should be added in small amounts and after each addition the mixture should be stirred until the soda is in solution. In case the temperature of the mixture rises to the point where $CS_2$ boils off, the mixture should be cooled before further amounts of soda are added. During the course of the reaction small quantities of water just sufficient to permit the soda to dissolve, are added. The total quantity of water should not exceed the weight of soda used. Sodium butyl xanthate tends to separate out if insufficient water is present and it is generally likely to form at the surface of the mixture. This formation should be continually scraped off and the mixture should be stirred slowly to avoid separation of the xanthate. After all the soda has been added enough water should be added to bring the total quantity up to the weight of soda used.

The reaction mixture is now transferred to a tall and narrow lead vessel provided with lead cooling coils and having a draw off cock at its bottom. Chlorine gas is passed into the liquid through a glass tube, reaching to the bottom of the vessel, and as rapidly as possible without letting it escape absorption. The amount of chlorine needed will slightly exceed the amount theoretically necessary to neutralize the soda, specifically 10 to 12 lbs. No stirring is required since the chlorine will sufficiently agitate the liquid. The temperature should be held between 40° and 50° C. by means of the cooling coils, but toward the end of the reaction the temperature should be allowed to rise to complete the reaction and boil off excess of alcohol or $CS_2$. The reaction is complete when a sample of the supernatant oil formed, will separate definitely as globules and sink to the bottom when poured into water, and when the reaction mixture in the vessel has become acid to litmus.

The reason for keeping the temperature low at the beginning of the chlorination is that the product thiocarbonic acid disulphide decomposes rapidly when heated with soda, particularly since the oxy normal butyl thiocarbonic acid disulphide does not separate out as an oil in the first stages of the reaction. Toward the end of the reaction, when nearly all of the soda has been neutralized, the danger of decomposition of the disulphide has passed and the temperature may then be allowed to rise, and it is, in fact, necessary that it should, in order to complete the reaction as stated.

As soon as chlorination has been completed, layers of the brine and salt formed should be drawn off from the bottom of the vessel and then the layer of oil consisting of the oxy normal butyl thiocarbonic acid disulphide should be removed. The latter is now washed thoroughly with water in an earthenware or wooden vessel equipped with a stirrer. The wash water is removed by decantation and the oil is then treated with a hot soda ash solution containing about ¾ lbs. per gallon of soda ash dissolved in water and the oil is washed with successive portions of the soda ash solution until a sample shows no development of acidity upon boiling with water. The oil is then finally washed again with water and then has a density of approximately 1.17–1.18 at 20° C. It is then dehydrated preferably with calcium chloride and filtered.

The alcohol, $CS_2$ and NaOH are present in approximately molecular proportions, an increased amount of $SC_2$ being added to allow for evaporation. The reactions are represented by the following equations:

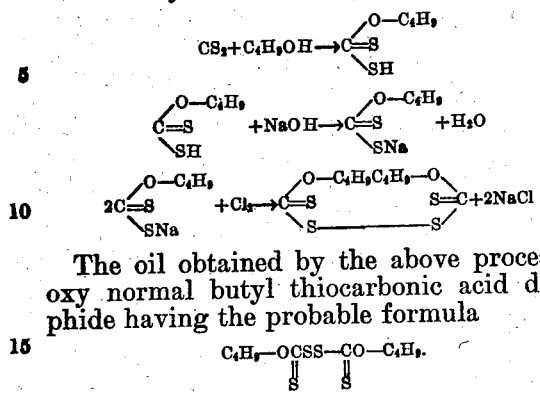

The oil obtained by the above process is oxy normal butyl thiocarbonic acid disulphide having the probable formula

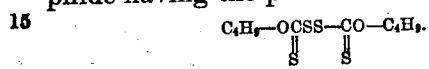

It should be clear and neutral and have a light yellow color. It is miscible with most organic solvents including $CS_2$ and $C_4H_9OH$. It dissolves sulphur which can be reprecipitated on cooling. It reacts in the cold with ammonia and primary amines to form thiourethanes and is decomposed by some metals, hence it should be stored in glass containers. It becomes viscous at $-40°$ to $-50°$ C. and solidifies near $-80°$ to $-90°$ C. It is useful as a rubber vulcanizer.

Although specific proportions and directions have been given in the above preferred embodiment, it is to be understood that various changes may be made without departing from the scope of the invention. For example, KOH or other caustic alkali may be used either powdered or in concentrated solution. The method of making the alkali methyl xanthate may be varied by substituting any other method of making alkali methyl xanthates. The lead vessels described above are suitable for use, since they are not attacked by the reaction substances, but other material may be used, such as earthenware or any other substance not attacked. No particular form of apparatus is essential, and such particular apparatus parts as the glass tube above mentioned are not essential but are only mentioned to complete the preferred embodiment. A temperature of $40°$ to $50°$ is the preferred range, but the temperature may be varied somewhat from this range.

Although the reaction has been set forth in connection with butyl alcohol, it will be understood that other alcohols behave similarly. Experiments have been made with other alcohols which show that the process may be carried out in a manner substantially identical with that employed with the butyl alcohol, it being only necessary to change the quantity of alcohol employed in the reaction in accordance with its combining weight. For example oxy methyl thiocarbonic acid disulphide, oxy ethyl thiocarbonic acid disulphide, oxy iso propyl thiocarbonic acid disulphide have been satisfactorily prepared from the corresponding methyl, ethyl and iso propyl alcohols, in accordance with the procedure herein set forth.

Having thus described my invention, what I claim and desire to protect by Letters Patent is:

1. The process of manufacturing oxy normal butyl thiocarbonic acid disulphide which comprises adding NaOH to a mixture of butyl alcohol and $CS_2$, all in approximately molecular proportions, while keeping the temperature down and adding just enough water to permit the soda to dissolve, chlorinating the reaction product at about $40°$ to $50°$ C. and removing the oil formed.

2. The process of manufacturing oxy normal butyl thiocarbonic acid disulphide which comprises adding powdered NaOH to a mixture of butyl alcohol and $CS_2$ while keeping the temperature down and adding just enough water to permit the soda to dissolve, chlorinating the reaction product at about $40°$ to $50°$ C. and purifying the oil formed.

3. The process of manufacturing oxy normal butyl thiocarbonic acid disulphide which comprises chlorinating an alkali metal xanthate at about $40°$ to $50°$ C. until the alkali has been nearly neutralized and an oil is formed, allowing the temperature to rise while completing the chlorination, and removing the supernatant oil formed.

4. The process of manufacturing oxy normal butyl thiocarbonic acid disulphide which comprises making a mixture of 25 lbs. normal butyl alcohol and 28 lbs. $CS_2$, adding gradually thereto with stirring and cooling several additions of powdered caustic soda until a total of $12\frac{1}{2}$ lbs. have been added, adding just sufficient water with each addition of soda to keep the latter in solution, adding an amount of water sufficient to bring the total amount up to $12\frac{1}{2}$ lbs. after all the soda has been added, chlorinating the reaction product in a lead vessel at $40°$ to $50°$ C. until the soda has been nearly neutralized and an oil forms, then allowing the temperature to rise while completing the chlorination, drawing off the brine and salt formed from the supernatant oil, washing the oil with water until neutral, dehydrating the oil with $CaCl_2$, and then filtering it.

Signed at Naugatuck, county of New Haven, State of Connecticut, this 2nd day of November, 1922.

HAROLD S. ADAMS.